United States Patent [19]

Cooper

[11] 4,252,600
[45] Feb. 24, 1981

[54] ULTRASONIC WELDING APPARATUS FOR MAKING A BELLOWS

[75] Inventor: William J. Cooper, Los Angeles, Calif.

[73] Assignee: International Telephone and Telegraph Corporation, New York, N.Y.

[21] Appl. No.: 86,649

[22] Filed: Oct. 22, 1979

Related U.S. Application Data

[62] Division of Ser. No. 965,295, Nov. 30, 1978.

[51] Int. Cl.³ .......................... B23K 1/06; B29C 27/08
[52] U.S. Cl. ................................ 156/580.2; 228/1 R; 425/174.2
[58] Field of Search ................. 156/73.1, 580.1, 580.2, 156/73.4, 587; 228/110, 1 R; 425/174.2

[56] References Cited

U.S. PATENT DOCUMENTS

| 2,636,861 | 4/1953 | Watson | 252/78.5 |
|---|---|---|---|
| 3,074,889 | 1/1963 | Attwood | 252/78.5 |
| 3,125,529 | 3/1964 | Simmons et al. | 252/78.5 |
| 3,483,066 | 12/1969 | Harris et al. | 156/580.2 |
| 3,525,454 | 8/1970 | Frederiksen | 156/73.1 |
| 3,707,500 | 11/1972 | Romano et al. | 252/78.5 |
| 3,947,307 | 3/1976 | Buchscheidt | 156/73.1 |
| 3,956,154 | 4/1976 | Marolewski et al. | 252/78.5 |
| 3,972,758 | 8/1976 | Bieber | 156/73.1 |
| 4,080,229 | 3/1978 | Williams | 156/580.1 |
| 4,131,505 | 12/1978 | Davis, Jr. | 156/580.2 |

FOREIGN PATENT DOCUMENTS 1103110  10/1955  France ..................................... 156/273

*Primary Examiner*—Michael G. Wityshyn
*Attorney, Agent, or Firm*—A. Donald Stolzy

[57] ABSTRACT

A method of making a non-corrosive plastic bellows by ultrasonic welding inner and outer flanges of discs with cylindrical and half-cylindrical horns, respectively. The half-cylindrical horn and a fixture used therewith have lips to fit on opposite sides of a pair of contacting outer flanges and in between two pairs of flanges. The inner flanges are thus welded first.

4 Claims, 8 Drawing Figures

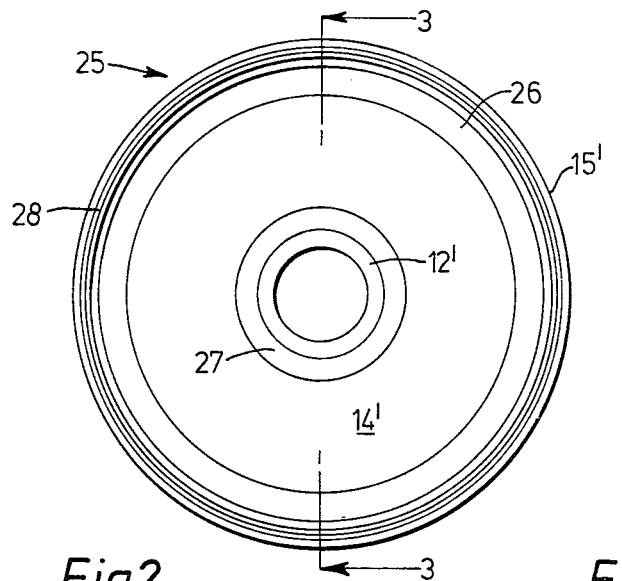
Fig.2.
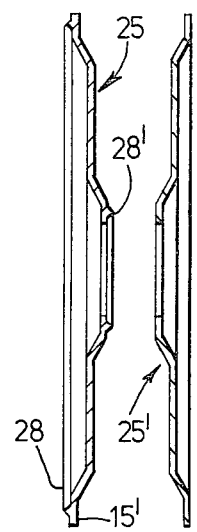
Fig.3.
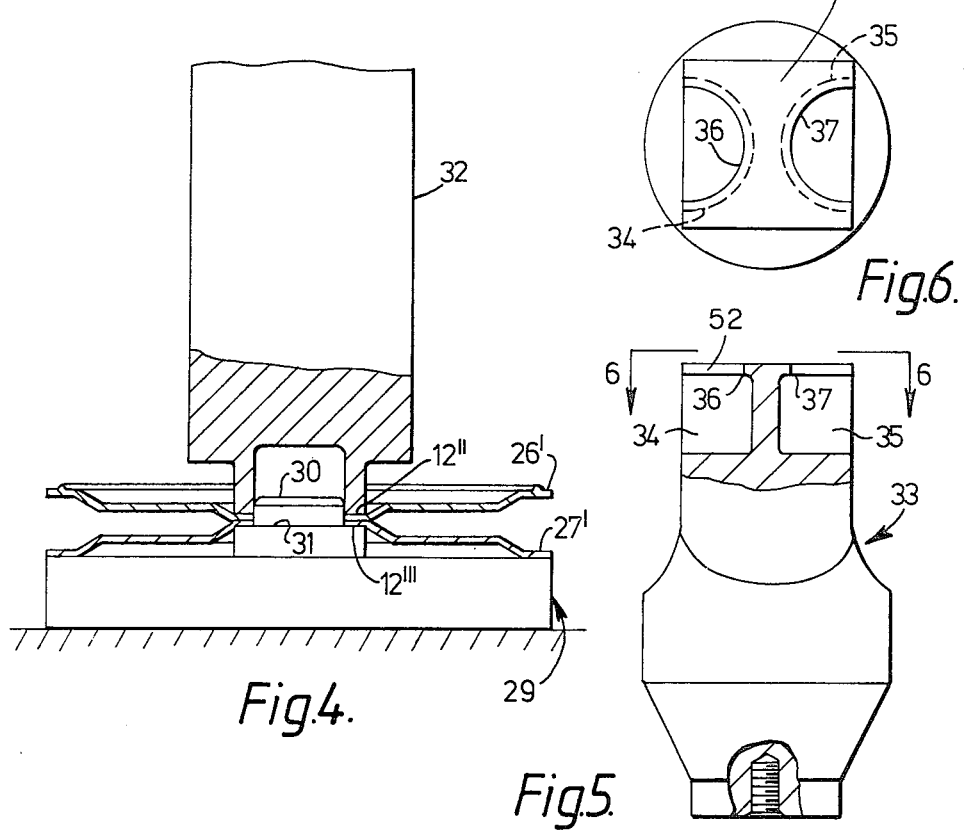
Fig.4.
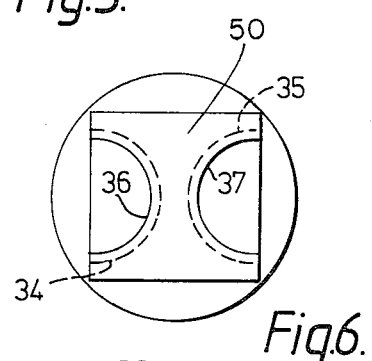
Fig.6.
Fig.5.

ULTRASONIC WELDING APPARATUS FOR MAKING A BELLOWS

This application is a division of copending parent application Ser. No. 965,295 filed Nov. 30, 1978. The benefit of the filing date of said copending application is, therefore, hereby claimed for this application.

BACKGROUND OF THE INVENTION

This invention relates to the art of fabricating fluid pressure sensitive bellows or the like, and more particularly to a manufacturing process and apparatus for making a bellows.

PRIOR ART STATEMENT

In the past it has been the practice to fabricate a bellows from discs of different metals by brazing, seam welding or stitching (overlapping spot welds). The discs of the present invention may, in fact, be of the same shape as some of those of the prior art. However, the discs of the present invention are made of a noncorrosive material.

A bellows may be used in a large variety of ways. However, a bellows is especially useful when employed in differential pressure units as disclosed, for example, in U.S. Pat. Nos. 2,400,048 and 2,989,084 issued May 7, 1946, and June 20, 1961, respectively. The finished product of the present invention may be, if desired, used directly in the last enumerated patent; however, a mounting ring and valve stem therein preferably are at least partially made of plastic instead of metal, as disclosed in the said patents, so that the plastic bellows of the present invention may be conveniently ultrasonically bonded thereto.

In the prior art it has been impossible to use metal bellows for sensing the pressure of a corrosive fluid.

SUMMARY OF THE INVENTION

In accordance with the method and apparatus of the present invention, the inner flanges of a plurality of pairs of apertured discs are ultrasonically bonded together, and two outer flanges of the two pairs are ultrasonically bonded together by a horn having an arcuately shaped cavity therein.

By making the discs of plastic, it is possible to use the bellows of the present invention while in contact with strong and highly concentrated acids, alkali metal bases and other highly corrosive materials.

BRIEF DESCRIPTION OF THE DRAWINGS

In the accompanying drawings which illustrate exemplary embodiments of the present invention:

FIG. 2 is a top plan view of a disc employed in the construction of the bellows shown in FIG. 1;

FIG. 3 is a transverse sectional view of two discs taken on the line 3—3 shown in FIG. 2;

FIG. 4 is a sectional view, partly in elevation, illustrating one welding step of the present invention;

FIG. 5 is an inverted side elevation view, partly in section, of an ultrasonic welding horn constructed in accordance with the present invention;

FIG. 6 is a bottom plan view of the horn shown in FIG. 5;

DESCRIPTION OF THE PREFERRED EMBODIMENTS

Figure 1:
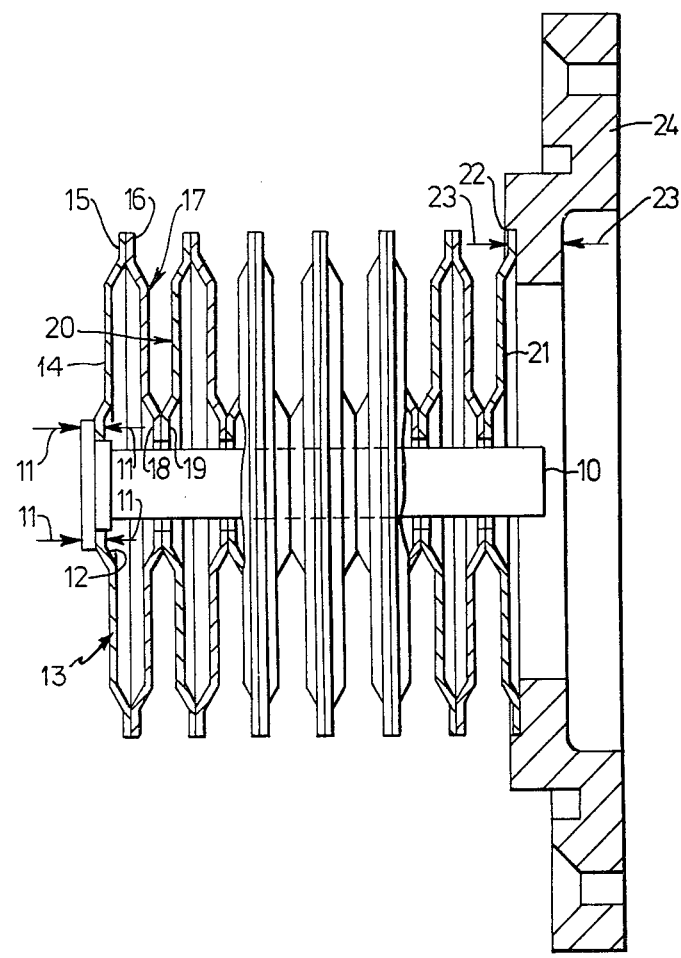
FIG. 1 is a side elevational view of a bellows, partly in section, which may be substituted for that shown in U.S. Pat. No. 2,989,084.

In the drawings in FIG. 1, a plastic valve stem 10 is ultrasonically welded at 11 to a central flange 12 of a disc 13.

Disc 13 has a symmetrical annular portion 14 that is connected to flange 12 and to a flange 15. Flange 15 is ultrasonically welded to flange 16 of an identical disc 17. Disc 17 has an inner flange 18 which is welded to a flange 19 of a disc 20, and so on. The last disc 21 has a flange 22 ultrasonically welded to a plastic disc 24 at 23.

It may be observed from U.S. Pat. No. 2,989,084 that the entire assembly shown in FIG. 1 may be substituted for a corresponding assembly wherein in the prior art the bellows has been made of metal. Note will be taken that all the discs 13, 17, 20, etc., in FIG. 1 are made of plastic. In all, many conventional ultrasonically weldable plastics may be employed. For example, a plastic of the polysulfone, ryton, or noryl type may be employed.

A disc 25 is shown in FIG. 2 which may be identical to disc 13. Discs 13 and 20 in FIG. 1 may be identical to each other, if desired.

Disc 25 may have flanges 15' and 12' similar to flanges 15 and 12 in FIG. 1.

In FIG. 2, a frusto-conical portion 26 connects flange 15' with a central portion 14'. A frusto-conical portion 27 connects flange 12' to portion 14'.

In FIG. 3, disc 25 has flange 15' with a triangular portion 28 integral therewith. Flange 12' has a similar portion 28'. A disc 25' has nothing like portions 28 or 28'. Portion 28 improves the bonding of flanges 15 and 16, for example, shown in FIG. 1. Portion 28' improves bonding of flanges 18 and 19.

A plurality of pairs such as discs 26' and 27' are ultrasonically welded together at flanges 12" and 12''' in the positions shown in FIG. 4. Flange 12" will carry a portion like portion 28' in FIG. 3, and flange 12''' will not carry a portion like portion 28'. Discs 26' and 27' may, if desired, be identical to discs 25 and 25', respectively (FIG. 3).

In FIG. 4, a fixture 29 is provided having a stud 30 with a flange 31 to hold discs 26' and 27'. A horn 32 is provided to ultrasonically weld discs 26' and 27' together. All of the longitudinal surfaces of horn 32 may be cylindrical.

For bonding of flanges 15 and 16, in FIG. 1, together, a horn 33 is provided as shown in FIG. 5. Horn 33 has surfaces 34 and 35 in the shape of half of a cylinder. The lower ends of surfaces 34 and 35 are terminated by lips 36 and 37, respectively, which in welding the outer flanges are placed between discs such as discs 26' and 27' shown in FIG. 4.

It is not necessary to mount disc pairs on both lips 36 and 37 simultaneously. If desired, only one side of horn 33 need be used.

Figure 7:
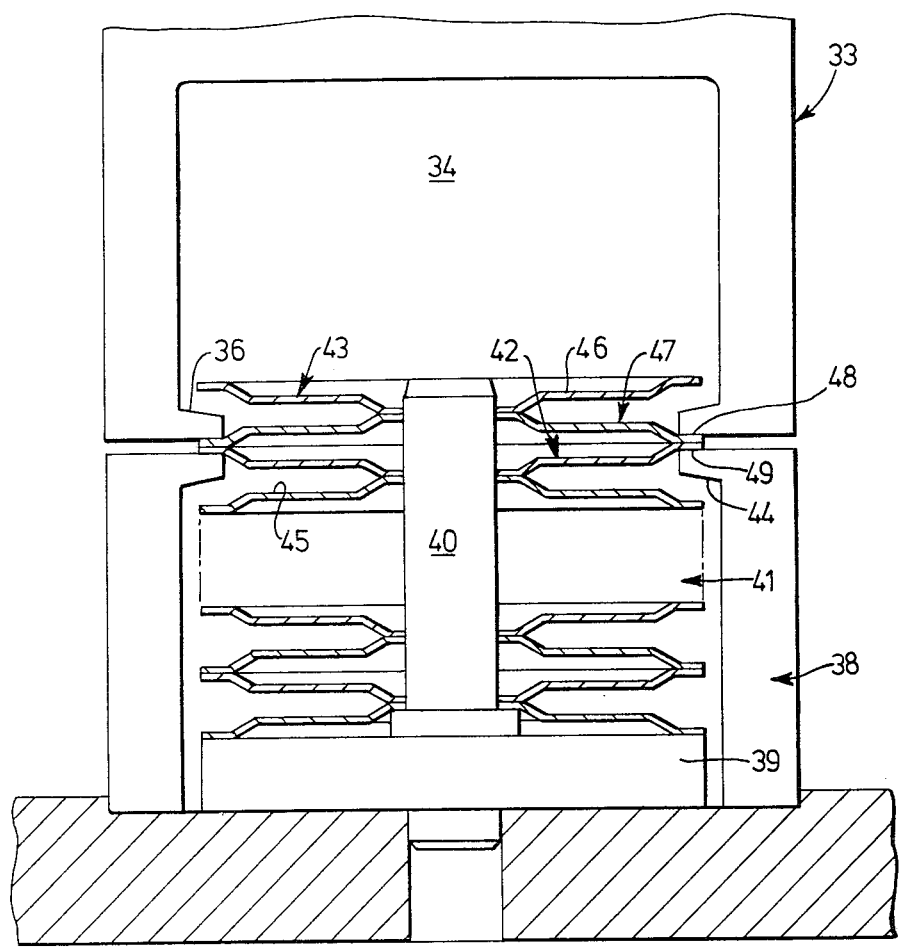
FIG. 7 is a side elevational view of the horn of FIGS. 5 and 6, and other structures employed in the performance of another step of the method of the present invention.

The manner in which horn 33 welds the outer disc flanges is illustrated in FIG. 7. A fixture 38 is provided for use with horn 33, fixture 38 being slidable in a direction perpendicular to the drawing in FIG. 7. A fixture 39 has a pin 40 onto which each subassembly (two discs welded at their central flanges) of the bellows is consecutively positioned. Pin 40 may be slidable with fixture 38.

The bellows indicated at 41 in FIG. 7 is built up by welding the outer flanges of each successive subassembly of two discs to the portion of the bellows already constructed.

In FIG. 7, disc 42 has already been fixed to each disc therebelow. Before subassembly 43 is welded to disc 42, disc 42 is placed over pin 40 and slidably mounted over a projection 44 on fixture 38. Subassembly 43 is mounted as shown. Pin 40 and fixture 38 are then slidably aligned with horn 33. Projection 44 on fixture 38 fits between disc 42 and disc 45 immediately therebelow.

Subassembly 43 is slidably pressed over lip 36 (FIG. 8) so that lip 36 lies between each of discs 46 and 47 when pin 40 and fixture 38 are slidably aligned as aforesaid.

The horns 32 and 33 may be excited in the usual conventional manner to ultrasonically weld the inner flanges such as 18 and 19 of discs 17 and 20 shown in FIG. 1, and to weld the lower flange 48 of disc 47 to the upper flange 49 of disc 42 shown in FIG. 7.

Figure 8:
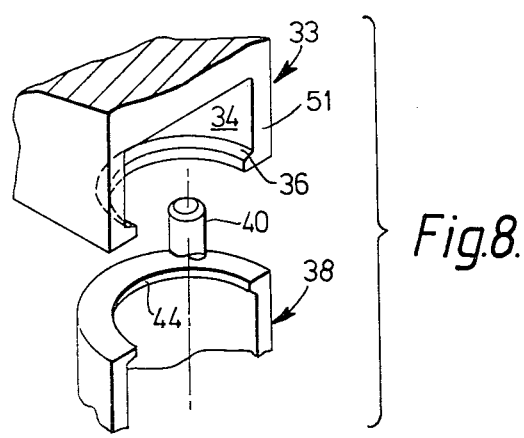
FIG. 8 is a broken-away perspective view of the plan of FIG. 6, and a fixture shown in FIG. 7.

The body of the welding horn is shown at 33 in FIG. 5. The body has an end face 50 (FIG. 6), and a front face 51 (FIG. 8). Surface 34 in FIG. 8 may be described as a "first surface." Surface 36 is a "second surface" parallel to end face 50. A third surface is provided at 52 in FIG. 5.

What is claimed is:

1. Ultrasonic welding apparatus comprising: an ultrasonic welding horn including a body having an end face, a front face and a central vertical axis in said front face, said body having a cavity extending into said front face partially defined by a first surface of said body, said first surface being a surface of revolution of a constant radius not to exceed 180 mechanical degrees around said axis, said body having a semi-circular second surface parallel to said end face, and a third semi-cylindrical surface normal to said second surface, said end face and said second and third surfaces partially defining a semi-cylindrical lip extending in an inward radial direction from said first surface.

2. The invention as defined in claim 1, wherein said body has an axis of polar symmetry parallel to the axis in said front face.

3. The invention as defined in claim 2, including a fixture having an inverted shape the same as said body in the vicinity of said lip to bond the peripheries of two arcuate plastic discs together when placed between said body and said fixture.

4. The invention as defined in claim 1, including a fixture having an inverted shape the same as said body in the vicinity of said lip to bond the peripheries of two arcuate plastic discs together when placed between said body and said fixture.

* * * * *